United States Patent
Nicols et al.

(10) Patent No.: US 11,317,349 B2
(45) Date of Patent: *Apr. 26, 2022

(54) METHOD AND APPARATUS FOR POWER SAVING IN PERSONAL AREA NETWORKS

(71) Applicant: III Holdings 6, LLC, Wilmington, DE (US)

(72) Inventors: Scott Christopher Nicols, Sheffield (GB); Adrian Ward, Cambridge (GB); Robert Cragie, Wakefield (GB)

(73) Assignee: III Holdings 6, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/166,086

(22) Filed: Feb. 3, 2021

(65) Prior Publication Data

US 2021/0235382 A1 Jul. 29, 2021

Related U.S. Application Data

(60) Continuation of application No. 16/434,644, filed on Jun. 7, 2019, now Pat. No. 10,945,208, which is a continuation of application No. 15/595,764, filed on May 15, 2017, now Pat. No. 10,321,400, which is a continuation of application No. 14/137,272, filed on Dec. 20, 2013, now Pat. No. 9,655,046, which is a division of application No. 12/239,319, filed on Sep. 26, 2008, now Pat. No. 8,638,701.

(51) Int. Cl.
*H04W 52/02* (2009.01)

(52) U.S. Cl.
CPC ... *H04W 52/0229* (2013.01); *H04W 52/0216* (2013.01); *Y02D 30/70* (2020.08)

(58) Field of Classification Search
CPC .......... H04W 52/0229; H04W 52/0216; Y02D 70/144; Y02D 70/00
See application file for complete search history.

(56) References Cited

U.S. PATENT DOCUMENTS

| | | | |
|---|---|---|---|
| 4,850,891 | A | 7/1989 | Walkup et al. |
| 5,495,533 | A | 2/1996 | Linehan et al. |
| 5,732,077 | A | 3/1998 | Whitehead |
| 5,801,985 | A | 9/1998 | Roohparvar et al. |

(Continued)

FOREIGN PATENT DOCUMENTS

| | | |
|---|---|---|
| EP | 0 859 314 A2 | 8/1998 |
| WO | WO 1999015999 | 4/1999 |

OTHER PUBLICATIONS

Caesar et al., "Design and Implementation of a Routing Control Platform," Usenix, NSDI '05 Paper, Technical Program, obtained from the Internet, on Apr. 13, 2021, at URL <https://www.usenix.org/legacy/event/nsdi05/tech/full_papers/caesar/caesar_html/>, 23 pages.

(Continued)

*Primary Examiner* — Christine Ng
(74) *Attorney, Agent, or Firm* — Crowell & Moring LLP

(57) ABSTRACT

Embodiments of the present invention provide a method of reducing power consumption in a wireless network device, comprising determining a duration prior to a beacon being received by the device; comparing the duration against a predetermined value; and adjusting a duration of a sleep period in response to the comparison.

20 Claims, 7 Drawing Sheets

(56) References Cited

U.S. PATENT DOCUMENTS

| | | |
|---|---|---|
| 5,930,167 A | 7/1999 | Lee et al. |
| 6,018,659 A | 1/2000 | Ayyagari et al. |
| 6,829,493 B1 | 12/2004 | Hunzinger |
| 7,035,854 B2 | 4/2006 | Hsaio et al. |
| 7,110,380 B2 | 9/2006 | Shvodian |
| 7,127,633 B1 | 10/2006 | Olson et al. |
| 7,206,610 B2 | 4/2007 | Iacono et al. |
| 7,243,351 B2 | 7/2007 | Kundu |
| 7,289,804 B2* | 10/2007 | Kim .................. H04W 52/0216 455/432.1 |
| 7,295,159 B1 | 11/2007 | Belcea et al. |
| 7,295,827 B2 | 11/2007 | Liu et al. |
| 7,298,716 B2 | 11/2007 | Abraham et al. |
| 7,408,887 B2 | 8/2008 | Sengupta et al. |
| 7,505,795 B1* | 3/2009 | Lim .................. H04W 52/0232 455/574 |
| 7,568,199 B2 | 7/2009 | Bozak et al. |
| 7,685,602 B1 | 3/2010 | Tran et al. |
| 7,881,755 B1* | 2/2011 | Mishra .............. H04W 52/0229 455/574 |
| 7,949,376 B2 | 5/2011 | Maekawa |
| 8,049,569 B1 | 11/2011 | Wright et al. |
| 8,160,045 B1* | 4/2012 | Chhabra ........... H04W 52/0209 370/342 |
| 8,185,762 B1* | 5/2012 | Spangler ............... G06F 1/3265 713/323 |
| 8,196,133 B2 | 6/2012 | Kakumani et al. |
| 8,638,701 B2* | 1/2014 | Nichols ............. H04W 52/0216 370/311 |
| 8,726,278 B1 | 5/2014 | Shawver et al. |
| 9,655,046 B2* | 5/2017 | Nicols ............... H04W 52/0216 |
| 10,321,400 B2* | 6/2019 | Nicols ............... H04W 52/0229 |
| 10,945,208 B2* | 3/2021 | Nicols ............... H04W 52/0229 |
| 2002/0032716 A1 | 3/2002 | Nagato |
| 2002/0059094 A1 | 5/2002 | Hosea et al. |
| 2003/0126013 A1 | 7/2003 | Shand |
| 2003/0154112 A1 | 8/2003 | Neiman et al. |
| 2004/0015973 A1 | 1/2004 | Skovira |
| 2005/0221869 A1* | 10/2005 | Liu ....................... G06F 1/3209 455/574 |
| 2006/0048157 A1 | 3/2006 | Dawson et al. |
| 2006/0088019 A1* | 4/2006 | Liebsch ............ H04W 52/0216 370/338 |
| 2006/0165031 A1* | 7/2006 | Wang .................... H04W 52/02 370/328 |
| 2006/0193296 A1 | 8/2006 | Zhong et al. |
| 2006/0250236 A1* | 11/2006 | Ackley ............... G08B 13/1966 340/540 |
| 2007/0162773 A1* | 7/2007 | Krantz .................. G06F 1/3203 713/300 |
| 2007/0253399 A1 | 11/2007 | Deshpande et al. |
| 2007/0281617 A1* | 12/2007 | Meylan ................. H04W 16/14 455/41.2 |
| 2007/0297438 A1 | 12/2007 | Meylan et al. |
| 2008/0095126 A1* | 4/2008 | Mahany ................ H04W 48/08 370/338 |
| 2008/0194201 A1* | 8/2008 | Sinivaara .......... H04W 52/0216 455/41.2 |
| 2011/0179134 A1 | 7/2011 | Mayo et al. |
| 2019/0357144 A1 | 11/2019 | Nicols |

OTHER PUBLICATIONS

Bader et al.; "Applications"; The International Journal of High Performance Computing Applications, vol. 15, No. ; pp. 181-185; Summer 2001.

Coomer et al.; "Introduction to the Cluster Grid—Part 1"; Sun Microsystems White Paper; 19 pages; Aug. 2002.

Joseph et al.; "Evolution of grid computing architecture and grid adoption models"; IBM Systems Journal, vol. 43, No. 4; 22 pages; 2004.

Smith et al.; "Grid computing"; MIT Sloan Management Review, vol. 46, Iss. 1.; 5 pages; Fall 2004.

"Microsoft Computer Dictionary, 5th Ed."; Microsoft Press; 3 pages; 2002.

"Random House Concise Dictionary of Science & Computers"; 3 pages; Helicon Publishing; 2004.

* cited by examiner

METHOD AND APPARATUS FOR POWER SAVING IN PERSONAL AREA NETWORKS

CROSS-REFERENCES TO RELATED APPLICATIONS

This application is a continuation of U.S. application Ser. No. 16/434,644, filed Jun. 7, 2019, which is a continuation of U.S. application Ser. No. 15/595,764, filed May 15, 2017, now U.S. Pat. No. 10,321,400, which is a continuation of U.S. application Ser. No. 14/137,272, filed Dec. 20, 2013, now U.S. Pat. No. 9,655,046, which is a division of U.S. patent application Ser. No. 12/239,319, filed Sep. 26, 2008, now U.S. Pat. No. 8,638,701, the disclosures of which are hereby incorporated by reference in their entirety.

BACKGROUND

The present invention relates to a method and apparatus for power saving in Wireless Personal Area Networks (WPANs). In particular, the present invention relates to power saving in beacon-enabled WPANs.

WPANs are typically implemented by small, low-cost wireless devices. A feature of such devices is their low power consumption, which should allow battery powered devices to operate substantially maintenance free for long periods of time. However, in beacon-enabled WPAN implementations, such as IEEE 802.15.4, a beacon is required to be periodically received by network devices. Since network devices must be capable of wireless data reception in order to receive a beacon a current consumption of those devices is thereby increased.

It is an object of embodiments of the invention to at least mitigate the above-mentioned problem of the prior art.

It is an aim of embodiments of the present invention to provide a method and apparatus which reduces current consumption in WPAN devices.

BRIEF DESCRIPTION OF THE DRAWINGS

Embodiments of the invention will now be described by way of example only, with reference to the accompanying figures, in which.

DETAILED DESCRIPTION OF EMBODIMENTS OF THE INVENTION

The IEEE 802.15.4-2003 standard, 802.15.4-2006 standard, or the 802.15.4a-2007 standards, which are available from http://www.ieee802.org/115/pub/TG4.html, define low-rate Wireless Personal Area Networks (WPANs). A WPAN is a wireless network which requires little or no infrastructure. Two types of device can participate in a personal area network (PAN); a full-function device (FFD) and a reduced function device (RFD). The FFD can operate as coordinator or a device (common node).

Use of an optional superframe is defined in relation to a MAC sublayer by the IEEE 802.15.4 standard. A superframe is bounded by network beacons broadcast by a coordinator and is divided into 16 equally sized timeslots. A beacon of the superframe is broadcast in the first timeslot.

Figure 1A:
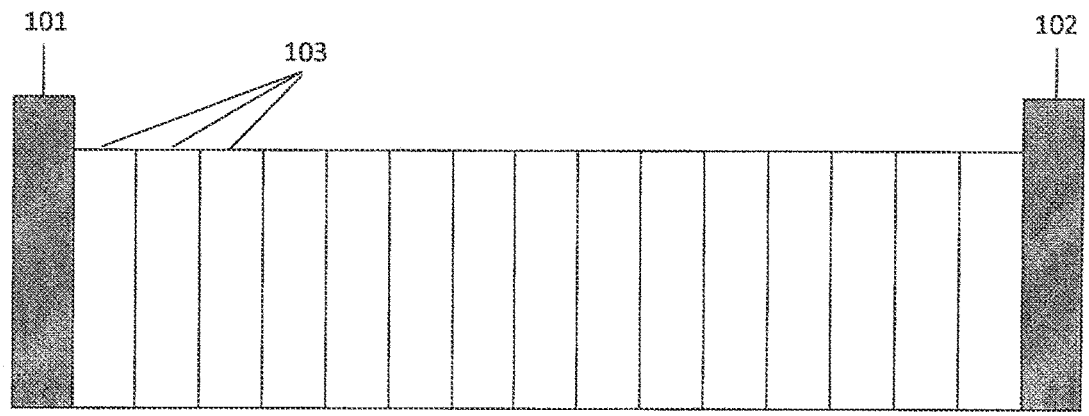
FIGS. 1A, 1B, and 1C show illustrations of three IEEE 802.15.4 superframe structures.
Figure 1B:
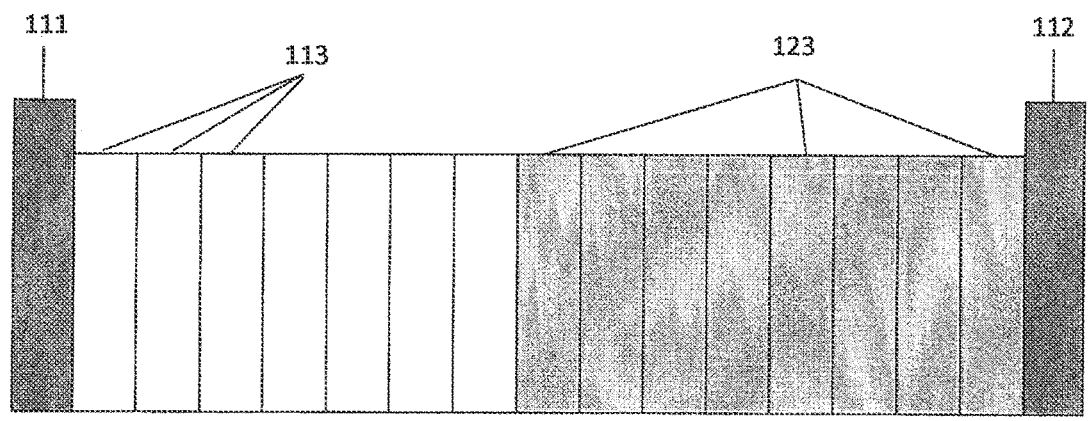
Figure 1C:
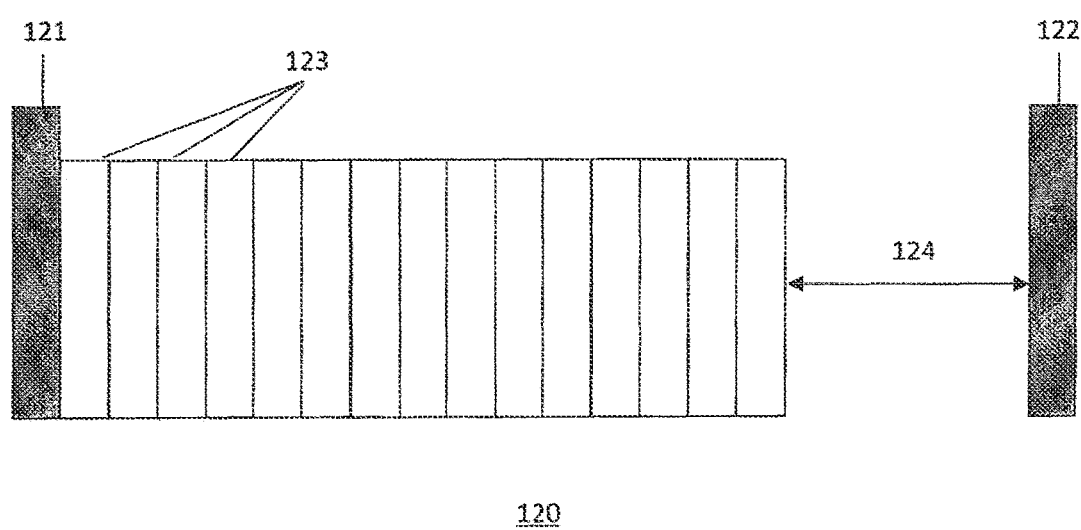

FIGS. 1A, 1B, and 1C show three illustrations of superframe structure. In FIG. 1A a first and second beacons 101, 102 are shown bounding the superframe 100 which comprises the sixteen equally sized time slots 103 (not all of which are labelled for clarity) interposing the beacons 101, 102. In the first illustration shown in FIG. 1A all sixteen slots 103 are allocated to a contention access period (CAP) during which any device wishing to communicate competes with other devices using a slotted CSMA-CA mechanism. In the illustration in FIG. 1B a predetermined number of time slots 113 are allocated to the CAP, whilst the remaining timeslots 123 of the superframe 123 have been dedicated to applications requiring specific data bandwidth as guaranteed time slots (GTSs) which form a contention free period (CFP). FIG. 1C shows the same superframe structure as in FIG. 1A having network beacons 121,122 and timeslots 123 but also includes an optional inactive period 124 between the final superframe time slot 123 and the beacon 122 of a following superframe. During the inactive period 124 the coordinator may enter a low power mode.

In a beacon enabled network a coordinator periodically transmits beacons to network devices in the PAN. Devices in the PAN receive network beacons to synchronise to the superframe structure and to determine if a data message is pending from the coordinator.

Embodiments of the present invention reduce a current consumption of a device in a beacon-enabled PAN by minimising an amount of time for which the device is awake i.e., not sleeping to receive a beacon.

In a first embodiment of the present invention a method and apparatus are provided wherein a PAN device is enabled to receive a beacon a predetermined time before a beacon is transmitted by a coordinator. A time period between a CPU of a beacon receiving device being woken to receive the beacon and the beacon being received is measured and adjusted to minimise a time for which the device is awake before a beacon is received. In some embodiments, the time period between the CPU being awoken is divided into a plurality of smaller sub-periods, as will be explained.

Figure 2:
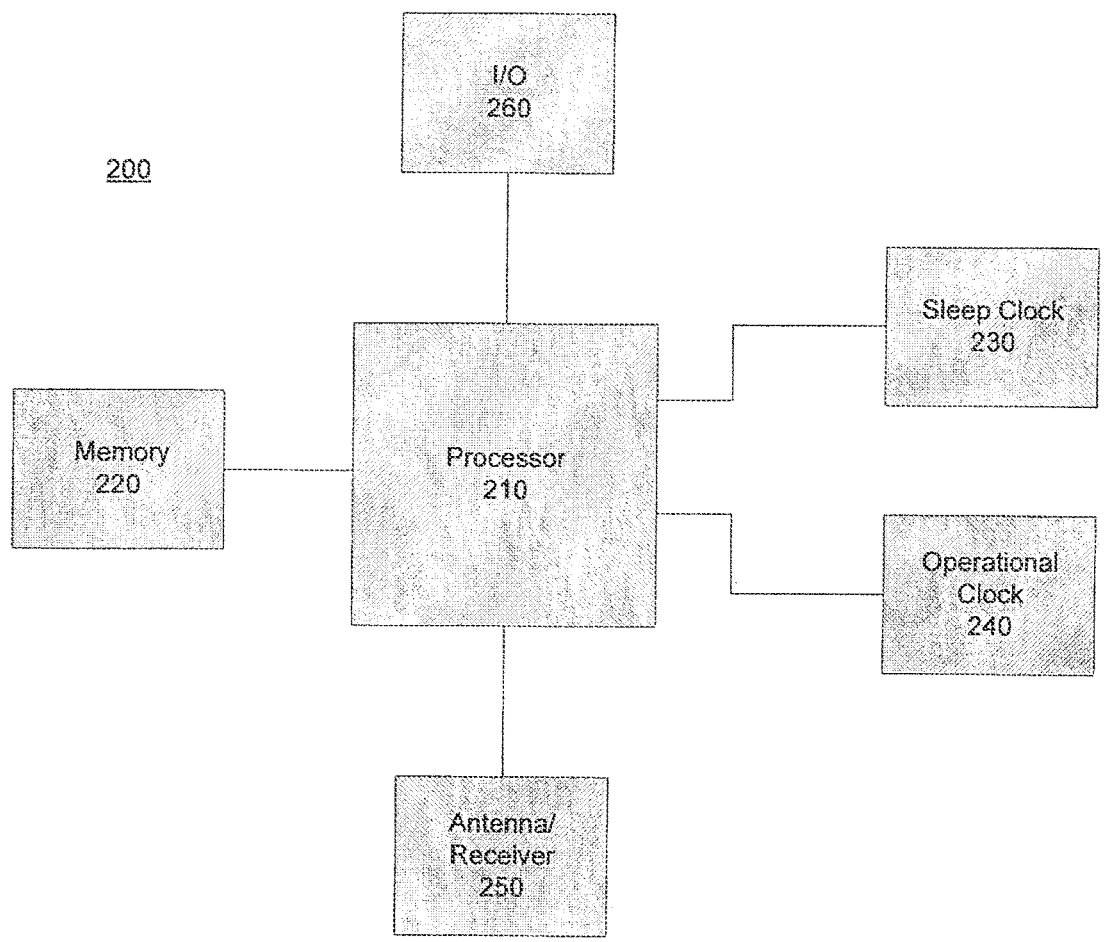
FIG. 2 shows a schematic illustration of an example wireless network device.

FIG. 2 shows a block diagram of a PAN device 200. It will be realised that the device 200 shown is an example of a PAN device and that other device structures are possible. The device 200 comprises a processor (CPU) 210 which operatively executes instructions thereon. The CPU 210 has at least two operational states, an operational state in which the CPU executes instructions and one or more lower-power states. One low-power state is often referred to as a sleep state during which the CPU 210 does not execute instructions to conserve power. In the illustrated example, the CPU 210 further comprises a second low-power state referred to as a doze state. In the doze state, the CPU has functionality and power consumption in-between that of the sleep and operational states. The CPU 210 may also be capable of implementing further power saving states. A memory 220 is coupled to the CPU 210. The memory 220 may store data and/or instructions therein. The memory 220 may be read-only or readable and writeable by the CPU 210. Connected to the CPU are a sleep clock 230 and an operational clock 240. The operational clock 240 provides a relatively high-frequency clock signal which is utilised when the CPU 210 is operational. The sleep clock 230 provides a lower frequency clock which is utilised during the sleep mode, for example to operate a sleep timer. Whilst the CPU 210 is in the sleep mode, the operational clock 240 is not operated to conserve power. One way in which the CPU 210 transitions between the sleep state and the operational state (wakes from the sleep state) is upon expiry of the sleep timer. In the illustrated example, the operational clock 240 provides a 16 MHz clock signal to the CPU 210, whilst the sleep clock 230 provides a 32 kHz clock signal to the CPU 210, although it will be realised that other frequency clock signals may be utilised. Similarly, it will be realised that in some embodiments only a single clock is utilised. The device 200 further comprises an antenna/receiver 250 for receiving wireless signals. The device 200 may further comprise one or more I/O devices 260, such as a display device, audible output device, user input device such as a device comprise one or more user operated keys, and other devices offering input/output functionality. In the described example, the device 200, and components thereof, is powered by a battery (not shown).

Figure 3:
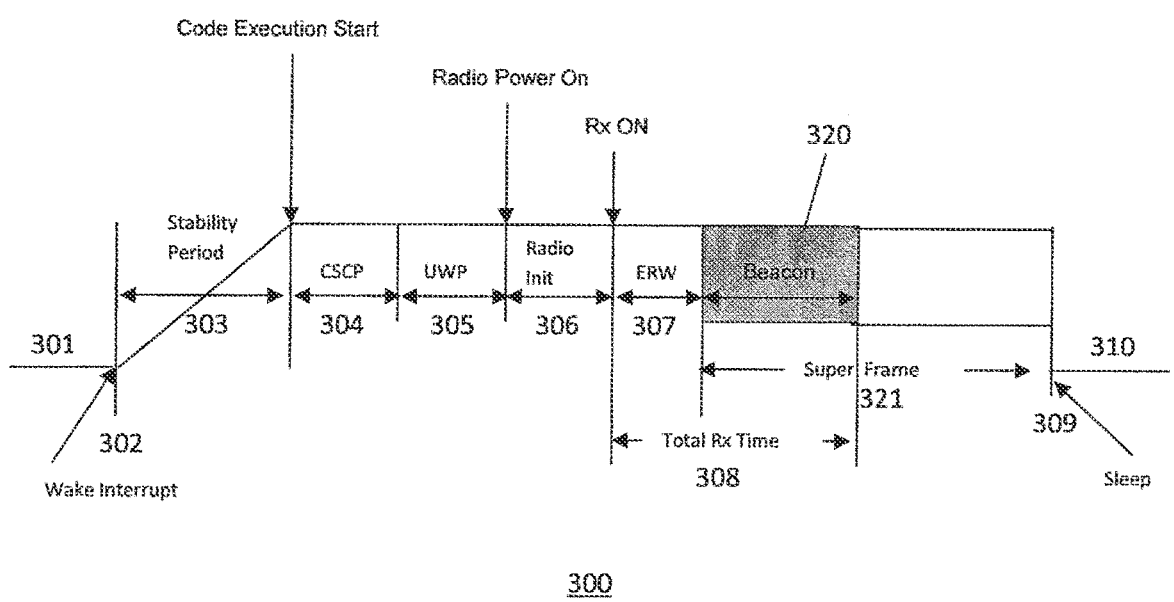
FIG. 3 shows a schematic illustration of a period during which a beacon is received by a device.

FIG. 3 illustrates a time period between the CPU 210 being asleep (in the sleep state), waking from the sleep state to the operational state, receiving a beacon 320 and returning to the sleep state. The CPU 210 is asleep in sleep period 301 during which the power consumption is reduced. A wake interrupt is generated at 302, in response to which the CPU 210 wakes from the sleep state 301. As discussed above, the wake interrupt 302 is generated by expiry of the sleep timer operated from the sleep clock 230.

Following the interrupt 302, a clock stability period 303 is provided during which the clock signal output by the operational clock 240 is allowed to stabilise. When the operational clock 240 is powered on following the interrupt 302, the output clock signal may not initially be stable and during the clock stability period 303 the output operational clock signal stabilises. The output of the operational clock 240 may be measured to determine when the operational clock is suitably stable for the stability period 303 to end. Thus, in some embodiments, the clock stability period has a variable duration dependent on the speed at which the clock signal output by the operational clock stabilises. In order to compensate for clock stability variation, a clock-stability compensation period (CSCP) 304 is provided. During CSCP 304 the device CPU 210 may be placed in the doze state to conserve power. CSCP 304 allows for clock start-up variability to be compensated for by providing a period of variable duration, dependent on the duration of the clock stability period 303. The total duration of the clock stability period 303 and the CSCP 304 equal a predetermined duration such that all following times are deterministic from the end of the CSCP 304.

A first period following the CSCP 304 is a user wake period (UWP) 305. UWP 305 is optional, in other words may have a duration of zero. When utilised the UWP 305 provides a time period for the CPU 210 to execute user-defined software instructions before the device 200 receives the beacon 320. The duration of UWP 305 may be configured user.

At an end of the UWP 305, the device 200 performs operations necessary to be ready to receive the beacon 320 during a radio initialisation period 306. The operations performed during this period 306 may comprise radio tuning and modem initialisation, such that following these operations the device 200 can wirelessly receive data. At the end of the period 306 the device 200 is capable of receiving the beacon 320.

A period of time referred to as an early receive window (ERW) 307 is provided between the device 200 being capable of receiving the beacon 320 and the device 200 actually beginning to receive the beacon. The ERW 307 allows for clock drift and/or instability between the low frequency sleep clock 230 and a high frequency clock of a coordinator broadcasting the beacons. Ideally, for minimum power consumption, the ERW should be of zero duration. However, due to clock drift and/or instability this may be impractical, or difficult to achieve. Therefore, a duration between the device 200 being capable of receiving the beacon 320 and beginning to receive the beacon 320 is measured. In embodiments of the present invention, the period 307 is adjusted to equal a predetermined duration by varying a length of a following sleep period 310. For example, if the ERW 307 duration exceeds the predetermined duration, the duration of a following sleep period 310 is increased, whereas if the ERW duration is less than the predetermined duration the duration of a following sleep period 310 is decreased. The ERW 307 duration may be measured by starting a timer once the device 200 is capable of receiving the beacon 320 and stopped once beacon reception begins. The timer value may then be compared against a value stored in memory 220 and a value of sleep timer increased or decreased accordingly. The sleep timer value may be changed by a predetermined value, or may be changed by a value dependent on the time by which the ERW 307 duration differs from the predetermined ERW duration.

The beacon 320 is received and denotes the beginning of a superframe 321. A further beacon (not shown) will also denote the end of the superframe 321. If the beacon indicates that no data is waiting for the device 200 and the device does not to transmit data it may immediately return to the sleep state following beacon reception, in which case a total time 308 for which the device 200 is operable to receive wireless communications is the duration of the ERW 307 and the beacon receive duration. Alternatively, following the end of the superframe 321 the device 200 may enter the sleep state 310 once again. The events shown in FIG. 3 will be repeated for a following beacon transmitted by the coordinator.

Figure 4:
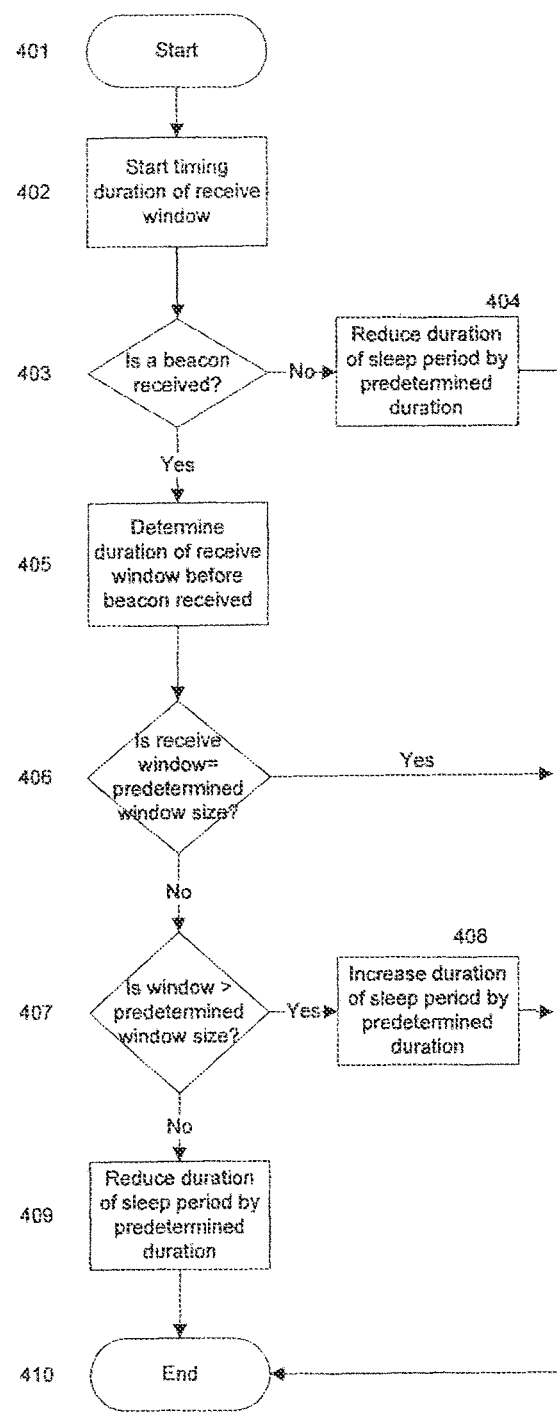
FIG. 4 shows an example method according to an embodiment of the invention.

FIG. 4 shows an embodiment of a method for determining the width of the ERW 307.

The method begins in step 401. In step 402 timing of the duration of the ERW is begun at a point in time at which the device 200 is capable of receiving wireless signals. In the described embodiment, the device 200 is capable of receiving wireless signals at an end of the radio initialisation period 306.

In step 403 it is determined whether a beacon has been received by the device 200. If no beacon is received by the device 200 within a predetermined duration of time, then it is assumed that the device 200 was not ready to receive the beacon 320 when it was transmitted by the coordinator. In other words, that the device 200 has missed the beacon 320 transmission. In order to try and prevent the device 200 failing to receive the next beacon 320, in step 404 a duration of the sleep period 310 is reduced. The duration of the sleep period 310 may be reduced by a predetermined amount or to a predetermined duration, for example reduced to a minimum duration so that beacon reception can be achieved again.

In step 405 a period of time for which the device 200 was capable of receiving the beacon and beacon reception beginning is determined. In the described embodiment, this is the duration between the start of the ERW 307 and the beacon 320 beginning to be received.

In step 406 it is determined if the duration of the ERW 307 is equal to a predetermined duration. As noted above, whilst a theoretically optimal duration of the ERW is zero, in practical applications an optimal duration of the ERW may have a predetermined non-zero duration. The duration of the measured ERW 307 is compared against the predetermined value. If the measured ERW 307 duration is equal to the predetermined duration, then the method ends in step 410. However, if the measured ERW 307 duration is not equal to the predetermined duration, then the method proceeds to step 407 based upon the determination that adjustment of the ERW 307 duration is required.

In step 407 it is determined if the duration of the ERW 307 is greater than the predetermined duration. If the ERW 307 duration is greater (longer) than the predetermined duration, then the duration of a following sleep period 310 is increased by a predetermined time in step 408. This has the effect of moving the relative point in time at which the device 200 is able to receive wireless signals closer to a time at which it is believed the coordinator will transmit a following beacon.

In step 409 it is assumed, by virtue of the two preceding decisions made in steps 406 and 407, that the ERW 307 has a duration which is less than the predetermined duration. Therefore, the device 200 is in danger of missing a following beacon if further clock drift and/or instability occurs. In step 409 the duration of the following sleep period 310 is reduced, such that the relative point in time at which the device 200 is able to receive wireless signals is moved away from a time at which it is believed the coordinator will transmit a following beacon. In other words, the device 200 will be able to receive the following beacon at an earlier point in time.

The method ends in step 410. The method shown in step 401-410 will be repeated for one or more following beacons. In some embodiments, method steps 401-410 are repeated for every beacon.

It will be realised that other structures of steps 406-409 are possible which have the same effect. For example, it may be determined in step 407 whether the ERW 307 duration is less than the predetermined size and step 408 consequently revised to decrease the following sleep period 310 duration. Embodiments of the present invention reduce current consumption of a wireless device in a beacon-enabled network by maintaining a duration for which the device 200 is able to receive a beacon at a predetermined duration, thus optimising a period for which the device's CPU 210 is in a power saving mode.

A second embodiment of the present invention will be now described.

In some embodiments of the present invention, a wireless communications device and method of operating the same in a beacon-enabled network are provided which selectively do not receive all beacons broadcast by a coordinator. The device sleeps for a longer duration than an interval at which beacons are broadcast by the coordinator. Only receiving some beacons conserves power. In some embodiments, the device may be woken by an interrupt which causes the device to adjust a sleep timer before returning to sleep, such that the device awakes to receive a beacon next broadcast by the coordinator.

Referring to FIG. 4, there is shown a series of beacons 510 broadcast by a coordinator. The illustrated series of beacons 510 comprises nine beacons 511-519 which are broadcast at a predetermined time interval 530 by the coordinator. Reception of beacons will be described in relation to the device shown in FIG. 2.

The device 200 is arranged to receive a first beacon 521 corresponding to broadcast beacon 511. It will be noted that beacon 511 may not be the first beacon broadcast by the device, merely the first beacon in the illustrated example. Following reception of the first beacon 521, the device 200 then enters the sleep state in which it is not capable of receiving any wireless communications, such as beacons 510. The duration of the sleep interval 540, controlled by the sleep timer of the device 200, is longer than the interval 530 at which beacons are broadcast. Therefore, the device 200 does not receive one or more beacons. In the illustrated example, the device does not receive beacons 512-514. However, the device 200 is awoken from the sleep state by the sleep timer which enables the device to receive beacon 515. The device 200 may obtain network information from received beacon 522. The device then re-enters the sleep state. In the illustrated example, the device has a 4:1 beacon receive ratio which it will be realised is merely an example and other beacon receive ratios can be envisaged. In some embodiments, the sleep duration 540 is a multiple of the beacon broadcast interval 430 or a close approximation thereof which allows the device to awaken in sufficient time to receive a beacon 515 following the broadcast interval 530 multiple.

In embodiments of the present invention, the duration of sleep period 530 may be varied dynamically, that is periodically changed, such that the device sleeps for one or more beacon transmission intervals 530. The duration of the sleep period may, in some embodiments, be changed for every beacon on a beacon to beacon basis, or for a group comprising a predetermined number of sleep beacons.

Figure 6:
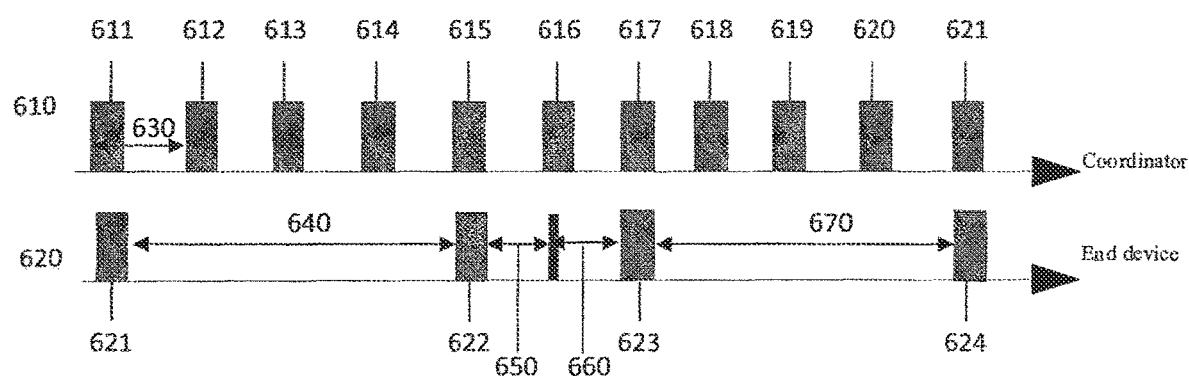
FIG. 6 shows an illustration of a device being woken by an interrupt to receive a following beacon.

Referring to FIG. 6, the device 200 may be woken by an interrupt other than that generated by the sleep timer. The interrupt causes the device 200 to adjust the remaining duration of the sleep timer, such that the device returns to sleep if sufficient time remains, then awakens to receive a following beacon.

Figure 5:
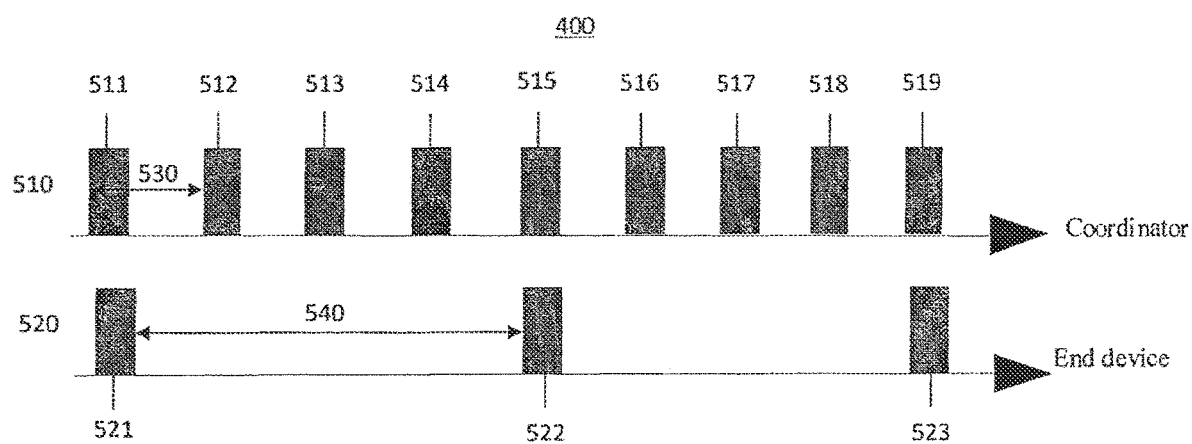
FIG. 5 shows an illustration of beacons transmitted by a coordinator and received by a device.

A plurality of beacons 610 are broadcast by a coordinator, as in FIG. 5. The broadcast beacons comprise 11 beacons 611-621 in the illustrated example, which are broadcast at a broadcast interval 630. Beacons 620 received by a device are also shown in FIG. 6. A first beacon 621 is received which corresponds to broadcast beacon 611. As in FIG. 5, the device 200 then enters a sleep mode for a duration 640 which is longer than the interval 630 between broadcast beacons, such that the device 200 enters the sleep state and only receives broadcast beacons periodically.

After receipt of beacon 622, the device 200 re-enters the sleep state by setting a sleep timer to have a duration which is longer than the beacon broadcast interval 630. In the example, the device enters the sleep mode for a duration equal to the sleep interval 640. For example, the sleep timer may be set to wake the device 200 in time to receive beacon 619. However, during the sleep interval an interrupt causes the device 200 to wake, that is to enter the operational mode in which instructions are executed by the CPU 210 of the device 200. In some embodiments, the device 200 may enter a fully operational mode. The interrupt is used to cause the device 200 to receive a following beacon 623, even when the sleep timer has a remaining duration which would cause the device 200 to remain asleep during the beacon broadcast. Once woken, the device 200 determines a time 660 for which it can re-enter the sleep state and wake in time to receive the following beacon 617. The duration 660 for which the device 200 can sleep may be determined by subtracting the time for which the device 200 has slept during the most recent sleep period 650 subtracted from the beacon broadcast interval 630. The remaining duration 660 is then stored in the sleep timer to cause the device to sleep until a time at which it can awake to receive the following beacon 623. In some embodiments, the device 200 is arranged to wake for a predetermined time period before the beacon transmission begins, such that the device is able to be capable of receiving the beacon at a time at which it is broadcast, as explained previously.

The external input allows the device to respond to external events, such as being responsive in reporting external events. For example, the external interrupt may be generated by a security sensor and the device may inform the coordinator of the activation of the sensor once woken by the interrupt. Alternatively, the external interrupt may be generated by a user operated device, such as a push-button. In some embodiments of the present invention, the device is utilised in applications where battery life is of great importance and by only receiving beacons periodically, that is at a lower frequency than at which they are broadcast, battery life can be increased. However, a rate at which the device 200 receives broadcast information is also reduced. Therefore, the button may be used to cause the device 200 to receive a next beacon and thus be responsive to information contained therein, such as update information.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of reducing power consumption in a wireless network device, comprising:
   receiving a beacon periodically broadcast at a beacon broadcast interval in a wireless network; and
   adjusting a sleep duration, in response to receiving an external interrupt, by subtracting a time for which the wireless network device has slept during a most recent sleep period from the beacon broadcast interval.

2. The method of claim 1, wherein the sleep duration is longer than the beacon broadcast interval.

3. The method of claim 1, wherein the sleep duration is determined such that the wireless network device does not receive every beacon broadcast.

4. The method of claim 1, wherein the sleep duration is determined such that the wireless network device has a beacon receive ratio of n:1, wherein n>1.

5. The method of claim 1, further comprising:
   waking from a sleep state to an operational state in response to an indication of an external event;
   determining the sleep duration such that the wireless network device is configured to receive a next broadcast beacon;
   sleeping for the determined sleep duration; and
   waking from the sleep state to receive the next broadcast beacon.

6. The method of claim 1, further comprising:
   varying the sleep duration for every beacon on a beacon to beacon basis.

7. The method of claim 1, further comprising:
   varying the sleep duration for a group comprising a predetermined number of sleep beacons.

8. The method of claim 1, further comprising:
   generating the external interrupt by a security sensor.

9. The method of claim 1, further comprising:
   generating the external interrupt by a user operated device.

10. The method of claim 1, wherein the wireless network device comprises a reduced function device (RFD).

11. A wireless network device, comprising:
    a receiver configured to receive a beacon periodically broadcast at a beacon broadcast interval in a wireless network; and
    a processor configured to adjust a sleep duration, in response to receiving an external interrupt, by subtracting a time for which the wireless communication apparatus has slept during a most recent sleep period from the beacon broadcast interval.

12. The wireless network device of claim 11, wherein the processor is configured to determine the sleep duration such that the wireless communication apparatus sleeps while at least one beacon is broadcast in the wireless network.

13. The wireless network device of claim 11, further comprising:
    an activator configured to wake the wireless network device from a sleep state, wherein in response to the wireless network device being woken from the sleep state, the processor is configured to determine the sleep duration such that the receiver is configured to receive a beacon next broadcast in the wireless network and to enter the sleep state for the determined duration.

14. The wireless network device of claim 11, wherein the sleep duration is determined such that the receiver is configured to receive selected beacons from among those broadcast in the wireless network.

15. The wireless network device of claim 11, wherein the sleep duration is varied for every beacon on a beacon to beacon basis.

16. The wireless network device of claim 11, wherein the sleep duration is varied for a group comprising a predetermined number of sleep beacons.

17. The wireless network device of claim 11, wherein a security sensor generates the external interrupt.

18. The wireless network device of claim 11, wherein a user operated device generates the external interrupt.

19. The wireless network device of claim 11, wherein the wireless network device comprises a reduced function device (RFD).

20. A non-transitory computer readable medium having instructions embodied thereon for reducing power consumption in a wireless network device, wherein the instructions, in response to execution by the wireless network device, cause the wireless network device to at least:
  receive a beacon periodically broadcast at a beacon broadcast interval in a wireless network; and
  adjust a sleep duration, in response to receiving an external interrupt, by subtracting a time for which the wireless network device has slept during a most recent sleep period from the beacon broadcast interval.

* * * * *